US008224182B2

(12) United States Patent
Kondo

(10) Patent No.: US 8,224,182 B2
(45) Date of Patent: Jul. 17, 2012

(54) SWITCH DEVICE, CONNECTION SYSTEM AND CONNECTION CONTROL METHOD

(75) Inventor: Shuhei Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 402 days.

(21) Appl. No.: 12/551,855

(22) Filed: Sep. 1, 2009

(65) Prior Publication Data

US 2010/0074615 A1 Mar. 25, 2010

(30) Foreign Application Priority Data

Sep. 24, 2008 (JP) .................................. 2008-243587

(51) Int. Cl.
*H04B 10/00* (2006.01)
*G06F 13/00* (2006.01)
*G06F 1/32* (2006.01)
*G06F 17/30* (2006.01)

(52) U.S. Cl. ................. 398/15; 398/21; 398/28; 398/38; 398/10; 713/320; 713/324; 710/20; 710/104

(58) Field of Classification Search .................... 398/15, 398/9–10
See application file for complete search history.

(56) References Cited

U.S. PATENT DOCUMENTS

| 5,687,079 A * | 11/1997 | Bauer et al. .................... 700/70 |
| 6,327,253 B1 * | 12/2001 | Frink ............................. 370/260 |
| 6,396,602 B1 * | 5/2002 | Kaiser et al. ..................... 398/45 |
| 2006/0086881 A1 * | 4/2006 | Miller ........................ 248/346.01 |

FOREIGN PATENT DOCUMENTS

JP 11-305881 A 11/1999
JP 2006178720 A 7/2006

\* cited by examiner

*Primary Examiner* — Shi K Li
*Assistant Examiner* — Oommen Jacob

(57) ABSTRACT

Reduction in power consumption at low costs is realized by a system with apparatuses connected with each other.

A switch device comprises transmission/reception unit each connected to each of apparatuses through a communication cable for transmitting/receiving a signal to/from each apparatus, and a connection switching unit for switching connection between the apparatuses by switching connection between the transmission/reception unit. Further provided are a reception state monitoring unit for monitoring a signal reception state of the transmission/reception unit, and a transmission stopping unit for executing signal transmission stopping processing according to a monitoring result obtained by the reception state monitoring unit with respect to other transmission/reception unit to which connected through that communication cable is other apparatus having a connection relationship with the apparatus to which the transmission/reception unit is connected through the communication cable.

11 Claims, 9 Drawing Sheets

SWITCH DEVICE, CONNECTION SYSTEM AND CONNECTION CONTROL METHOD

INCORPORATION BY REFERENCE

This application is based upon and claims the benefit of priority from Japanese patent application No. 2008-243587, filed on Sep. 24, 2008, the disclosure of which is incorporated herein in its entirety by reference.

TECHNICAL FIELD

The present invention relates to a switch device and, more particularly, to a switch device which switches connection between a plurality of devices.

BACKGROUND ART

In recent years, various kinds of information apparatuses have been widespread, among which there exist many systems formed with apparatuses connected with each other. It is possible, for example, to connect a host computer and a disk array device to form a computer system and use the same.

In such a computer system, a host computer and a disk array device, for example, are connected by a communication cable such as an optical transmission cable. In those days, in particular, widespread is an SAN (Storage Area Network) structured to have a plurality of host computers and a plurality of disk array devices connected through an optical switch device as shown in Patent Literature 1.

In addition, when such a system with devices connected to each other as described above has a relationship of master and servant, a procedure for cutting off power of them is defined. In the above-described computer system formed of a host computer and a disk array device, it is a common practice that the disk array device should be constantly activated while the host computer is being activated. It is therefore necessary to cut off the power of the disk array device after the host computer power cut-off operation is completed.

Patent Literature 1: Japanese Patent Laying-Open No. 2006-178720.

Patent Literature 2; Japanese Patent Laying-Open No. H11-305881.

In a system in which a power cut-off procedure is defined as described above, however, there occur various kinds of problems caused by the power cut-off processing. When the power cut-off processing is manually executed, for example, since the power of the disk array device should be cut off after waiting for completion of power cut-off of the host computer, the cut-off processing takes much time. There might occur a situation that because free time is generated while other processing is executed, for example, or for other reason after power cut-off processing of the host computer, cut-off of the power of the disk array device is forgotten. As a result, wasteful power consumption is generated.

On the other hand, as a technique for automatically cutting off power of a host computer and a disk array device, there exists a system using an uninterruptible power supply (UPS) which is disclosed in Patent Literature 2. In a case of such a system, however, since it is necessary to set up a system with an uninterruptible power supply incorporated, the system structure will be complicated to require costs.

Then, when applying the above-described manual or automatic power cut-off method to the above-described SAN, the foregoing problems become more conspicuous. In other words, in a case of SAN, since it has many devices which control power cut-off and a connection relationship between a host computer and a disk array device is complicated, its power cut-off procedure will be complicated. Moreover, in a case using the above-described UPS, the necessary number of UPSs will be increased to require more costs. Then, such a problem occurs not only in the above-described computer system with a host computer and a disk array device connected but also in a system with various information apparatuses connected with each other.

An object of the present invention is to reduce power consumption at low costs in a system with apparatuses connected with each other, which is a solution to the above-described problems.

SUMMARY

An object of the present invention is to provide a switch device, a connection system and a connection control method which enable reduction in power consumption at low costs in a system with apparatuses connected with each other.

According to a first exemplary aspect of the invention, a switch device, comprising:

transmission/reception unit each connected to each of apparatuses through a communication cable for transmitting/receiving a signal to/from each apparatus;

a connection switching unit for switching connection between the apparatuses by switching connection between the transmission/reception unit;

a reception state monitoring unit for monitoring a signal reception state of the transmission/reception unit; and a transmission stopping unit for executing signal transmission stopping processing according to a monitoring result obtained by the reception state monitoring unit with respect to other the transmission/reception unit to which connected through the communication cable is other the apparatus having a connection relationship with the apparatus to which the transmission/reception unit is connected through the communication cable.

According to a second exemplary aspect of the invention, a connection system, comprising:

a switch device including transmission/reception unit each connected to each of apparatuses through a communication cable for transmitting/receiving a signal to/from each apparatus, and a connection switching unit for switching connection between the apparatuses by switching connection between the transmission/reception unit; and the apparatus, wherein the switch device comprising a reception state monitoring unit for monitoring a signal reception state of the transmission/reception unit, and a transmission stopping unit for executing signal transmission stopping processing according to a monitoring result obtained by the reception state monitoring unit with respect to other the transmission/reception unit to which connected through the communication cable is other the apparatus having a connection relationship with the apparatus to which the transmission/reception unit is connected through the communication cable, and the apparatus comprises a reception stop detecting unit for detecting the device itself receiving no signal or not, and a power cut-off unit for cutting off power of the device itself when the reception stop detecting unit detects no signal reception.

According to a third exemplary aspect of the invention, a computer readable medium storing a program, which program causes a switch device having transmission/reception unit each connected to each of apparatuses through a communication cable for transmitting/receiving a signal to/from each apparatus and a connection switching unit for switching connection between the apparatuses by switching connection between the transmission/reception unit to execute:

a reception state monitoring function of monitoring a signal reception state of the transmission/reception unit; and a transmission stopping function of executing signal transmission stopping processing according to a monitoring result obtained by the reception state monitoring function with respect to other the transmission/reception unit to which connected through the communication cable is other the apparatus having a connection relationship with the apparatus to which the transmission/reception unit is connected through the communication cable.

According to a fourth exemplary aspect of the invention, a connection control method of a switch device having transmission/reception unit each connected to each of apparatuses through a communication cable for transmitting/receiving a signal to/from each apparatus and a connection switching unit for switching connection between the apparatuses by switching connection between the transmission/reception unit, comprising:

a reception state monitoring step of monitoring a signal reception state of the transmission/reception unit; and a transmission stopping step of executing signal transmission stopping processing according to a monitoring result obtained at the reception state monitoring step with respect to other the transmission/reception unit to which connected through the communication cable is other the apparatus having a connection relationship with the apparatus to which the transmission/reception unit is connected through the communication cable.

According to this invention, reduction in power consumption at low costs in a system with apparatuses connected with each other is realized by the above configuration.

EXEMPLARY EMBODIMENT

Figure 1:
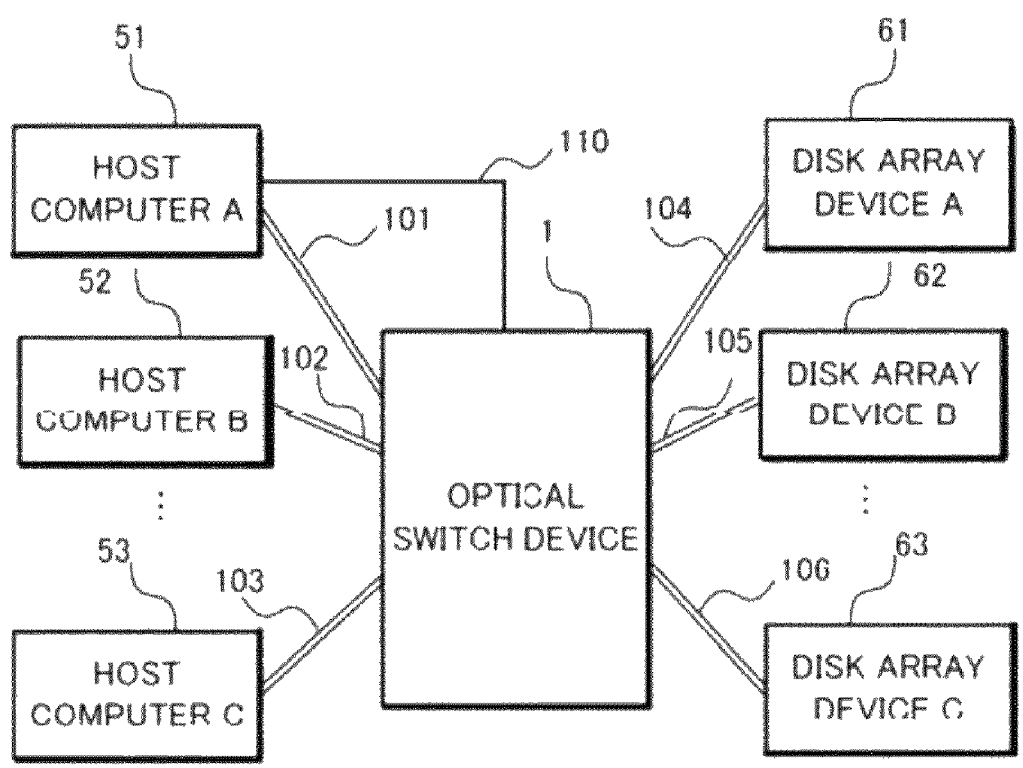
FIG. 1 is a block diagram showing a structure of an entire system according to a first exemplary embodiment.

A switch device as one mode of implementation according to the present invention comprises transmission/reception unit each connected with each of apparatuses through a communication cable to transmit/receive a signal to/from each apparatus and a connection switching unit for switching connection between the apparatuses by switching connection between the transmission/reception unit, as well as comprising a reception state monitoring unit for monitoring a signal reception state of the transmission/reception unit, and a transmission stopping unit for, according to a monitoring result obtained by the reception state monitoring unit, executing signal transmission stopping processing with respect to other transmission/reception unit to which connected through the communication cable is other apparatus having a connection relationship with the apparatus to which the transmission/reception unit monitored by the relevant reception state monitoring unit is connected through the communication cable.

The switch device first monitors a signal reception state of the transmission/reception unit to monitor a power state of an apparatus connected to the transmission/reception unit through the communication cable. Then, according to a signal reception state of the monitored transmission/reception unit, the switch device executes signal transmission stopping processing with respect to other transmission/reception unit to which other apparatus having a connection relationship with an apparatus to which the transmission/reception unit in question is connected. This brings signal transmission from the switch device to other apparatus into a stopped state. Accordingly, by detecting a signal reception state of its own apparatus, other apparatus is allowed to cut-off power, so that automatic cut-off of power can be set, for example. As a result, even in a case of switching the connection of a plurality of apparatuses through a switch device, mounting the above-described function on the switch device realizes power cut-off of the apparatus to enable reduction in power consumption at low costs.

Then, in the switch device, the communication cable is an optical transmission cable, while the transmission/reception unit is a photoelectric transducer for converting an optical signal communicated with the apparatus through the optical transmission cable into an electric signal, the reception state monitoring unit comprises a quantity of light monitoring unit for monitoring a quantity of received light of the photoelectric transducer and the transmission stopping unit comprises a quantity of light eliminating unit for eliminating a quantity of transmission light of other photoelectric transducer as other transmission/reception unit.

Also in the switch device, the quantity of light monitoring unit monitors whether the quantity of received light of the photoelectric transducer is 0 or not and the quantity of light eliminating unit eliminates a quantity of transmission light of other photoelectric transducer to which connected through the optical transmission cable is other apparatus having a connection relationship with the apparatus to which the photoelectric transducer whose quantity of received light attains 0 as a result of monitoring by the quantity of light monitoring unit is connected through the optical transmission cable.

In addition, in the switch device, when as a result of monitoring by the quantity of light monitoring unit, quantities of received light of all the photoelectric transducers to which connected through the optical transmission cables are all the apparatuses having a connection relationship with a specific apparatus attain 0 based on connection path information indicative of a connection relationship set in advance between the apparatuses, the quantity of light eliminating unit eliminates a quantity of transmission light of other photoelectric transducer to which the specific apparatus is connected through the optical transmission cable.

As a result, in a case of a system with an apparatus connected to a switch device through an optical transmission cable, monitoring a quantity of received light of the photoelectric transducer enables a power state of the connected apparatus to be monitored with ease. When the quantity of received light attains 0, for example, determination can be made that power of a connected apparatus is cut off. Then, by eliminating a quantity of transmission light of a photoelectric transducer to which other apparatus having a connection relationship with the apparatus in question is connected, transmission to other apparatus can be stopped to recognize with ease that other apparatus in question is in a state allowing power cut-off. When other device (specific device) has a connection relationship with a plurality of apparatuses in the switch device, it is, in particular, possible with ease to detect all the plurality of apparatuses attaining their quantities of received light of 0, thereby enabling power of other device (specific device) to be cut off. "Quantity of received light being 0" represents that the quantity of received light is not more than a certain threshold value (e.g. "−20 dBm"). This is because with no cable connected, there occurs a case where not 0 but a small quantity of light is detected.

In addition, in the switch device, the reception state monitoring unit operates at time intervals set in advance and the transmission stopping unit operates every time the reception state monitoring unit detects the transmission/reception unit being in a signal received state.

The switch device also comprises a connection path information storing unit for storing connection path information indicative of a connection relationship set in advance between the apparatuses, in which the transmission stopping unit executes signal transmission stopping processing with respect to other transmission/reception unit to which connected through the communication cable is other apparatus having a connection relationship with the apparatus to which the transmission/reception unit monitored by die reception state monitoring unit is connected through the communication cable based on the connection path information.

In addition, in the switch device, the apparatus to which the transmission/reception unit monitored by the reception state monitoring unit is connected through the communication cable is a host computer and other apparatus to which other transmission/reception unit whose signal transmission stopping processing is executed by the transmission stopping unit is connected through the communication cable is a storage device.

A connection system as another mode of implementation according to the present invention comprises a switch device including transmission/reception unit each connected with each of apparatuses through a communication cable to transmit/receive a signal to/from each apparatus and a connection switching unit for switching connection between the apparatuses by switching connection between the transmission/reception unit, and the above apparatus, in which the switch device comprises a reception state monitoring unit for monitoring a signal reception state of the transmission/reception unit, and a transmission stopping unit for, according to a monitoring result obtained by the reception state monitoring unit, executing signal transmission stopping processing with respect to other transmission/reception unit to which connected through the communication cable is other apparatus having a connection relationship with the apparatus to which the transmission/reception unit monitored by the reception state monitoring unit is connected through the communication cable, and the apparatus comprises a reception stop detecting unit for detecting the device itself being in a state of receiving no signal or not, and a power cut-off unit for cutting off power of its own device when the reception stop detecting unit detects no signal reception.

Then, in the connection system, the communication cable is an optical transmission cable, while the transmission/reception unit that the switch device has is a photoelectric transducer for converting an optical signal communicated with the apparatus through the optical transmission cable into an electric signal, the reception state monitoring unit that the switch device has comprises a quantity of light monitoring unit for monitoring a quantity of received light of the photoelectric transducer and the transmission stopping unit that the switch device has comprises a quantity of light eliminating unit for eliminating a quantity of transmission light of other photoelectric transducer as other transmission/reception unit, and the apparatus comprises a photoelectric transducer connected to the optical transmission cable connected to the switch device, in which the reception stop detecting unit that the apparatus has detects the quantity of received light of the photoelectric transducer provided in the device itself being 0 or not and the power cut-off unit that the apparatus has cuts off the power of the device itself when the reception stop detecting unit detects the quantity of received light of the photoelectric transducer being 0.

In addition, in the connection system, the apparatus to which the transmission/reception unit monitored by the reception state monitoring unit that the switch device has is connected through the communication cable is a host computer and other apparatus to which other transmission/reception unit whose signal transmission stopping processing is executed by the transmission stopping unit that the switch device has is connected through the communication cable is a storage device.

A program as a further mode of implementation according to the present invention enables a switch device comprising transmission/reception unit each connected with each of apparatuses through a communication cable to transmit/receive a signal to/from each apparatus and a connection switching unit for switching connection between the apparatuses by switching connection between the transmission/reception unit to realize a reception state monitoring unit for monitoring a signal reception state of the transmission/reception unit, and a transmission stopping unit for, according to a monitoring result obtained by the reception state monitoring unit, executing signal transmission stopping processing with respect to other transmission/reception unit to which connected through the communication cable is other apparatus having a connection relationship with the apparatus to which the transmission/reception unit monitored by the reception state monitoring unit is connected through the communication cable.

Then, in the program, when the communication cable is an optical transmission cable, while the transmission/reception unit is a photoelectric transducer for converting an optical signal communicated with the apparatus through the optical transmission cable into an electric signal, the reception state monitoring unit monitors a quantity of received light of the photoelectric transducer and the transmission stopping unit eliminates a quantity of transmission light of other photoelectric transducer as other transmission/reception unit.

A connection control method as a still further mode of implementation according to the present invention has, in a switch device comprising transmission/reception unit each connected with each apparatus through a communication cable to transmit/receive a signal to/from each apparatus and a connection switching unit for switching connection between the above apparatuses by switching connection between the transmission/reception unit, the reception state monitoring step of monitoring a signal reception state of the transmission/reception unit, and the transmission stopping step of executing, according to a monitoring result obtained at the reception state monitoring step, signal transmission stopping processing with respect to other transmission/reception unit to which connected through the communication cable is other apparatus having a connection relationship with the apparatus to which the transmission/reception unit monitored at the reception state monitoring step is connected through the communication cable.

Then, in the connection control method, when the communication cable is an optical transmission cable, while the transmission/reception unit is a photoelectric transducer for converting an optical signal communicated with the apparatus through the optical transmission cable into an electric signal, the reception state monitoring step monitors a quantity of received light of the photoelectric transducer and the transmission stopping step eliminates a quantity of transmission light of other photoelectric transducer as other transmission/reception unit.

The connection control method also has the reception stop detecting step of detecting other apparatus connected through the communication cable to other transmission/reception unit whose quantity of transmission light is eliminated at the transmission stopping step being at a state of receiving no signal or not and the power cut-off step of cutting off power of other apparatus when the reception stop detecting step detects other apparatus being at the state of receiving no signal.

Also in the connection control method, the reception stop detecting step detects the quantity of received light of the photoelectric transducer which is connected to an optical transmission cable as the communication cable to which other apparatus is connected and which is disposed at other apparatus being 0 or not and the power cut-off step cuts off the power of other apparatus when the reception stop detecting step detects the quantity of received light of the photoelectric transducer being 0.

Because of having the same functions as those of the above-described switch device, even an invention related to thus structured connection system, program or connection control method attains the foregoing objects of the present invention.

In the following, description will be made of each exemplary embodiment of a switch device, a connection system, a program and a connection control method according to the present invention with reference to FIG. 1 through FIG. 9.

FIRST EXEMPLARY EMBODIMENT

Figure 2:
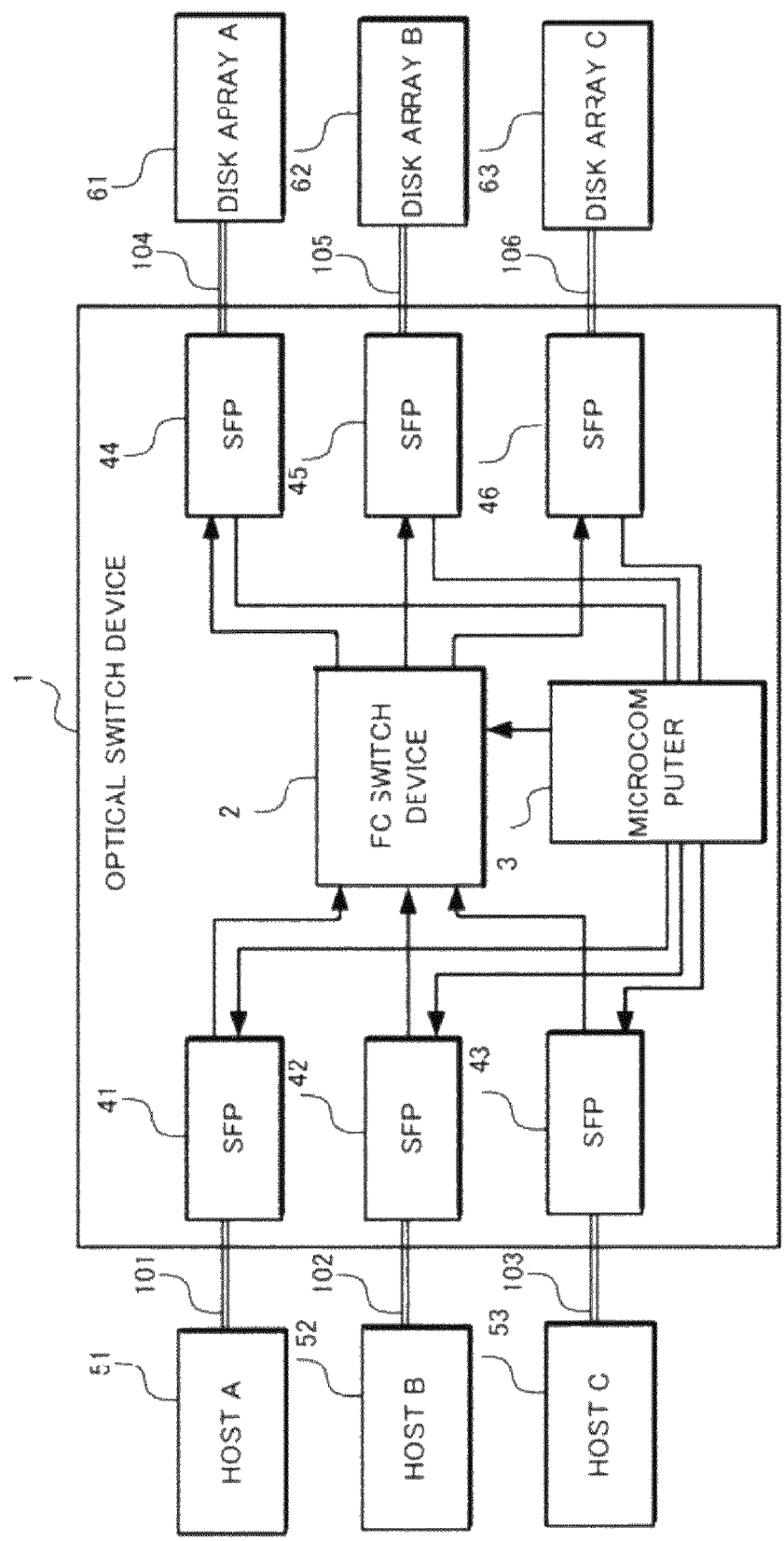
FIG. 2 is a block diagram showing an internal structure of an optical switch device illustrated in FIG. 1.
Figure 3:
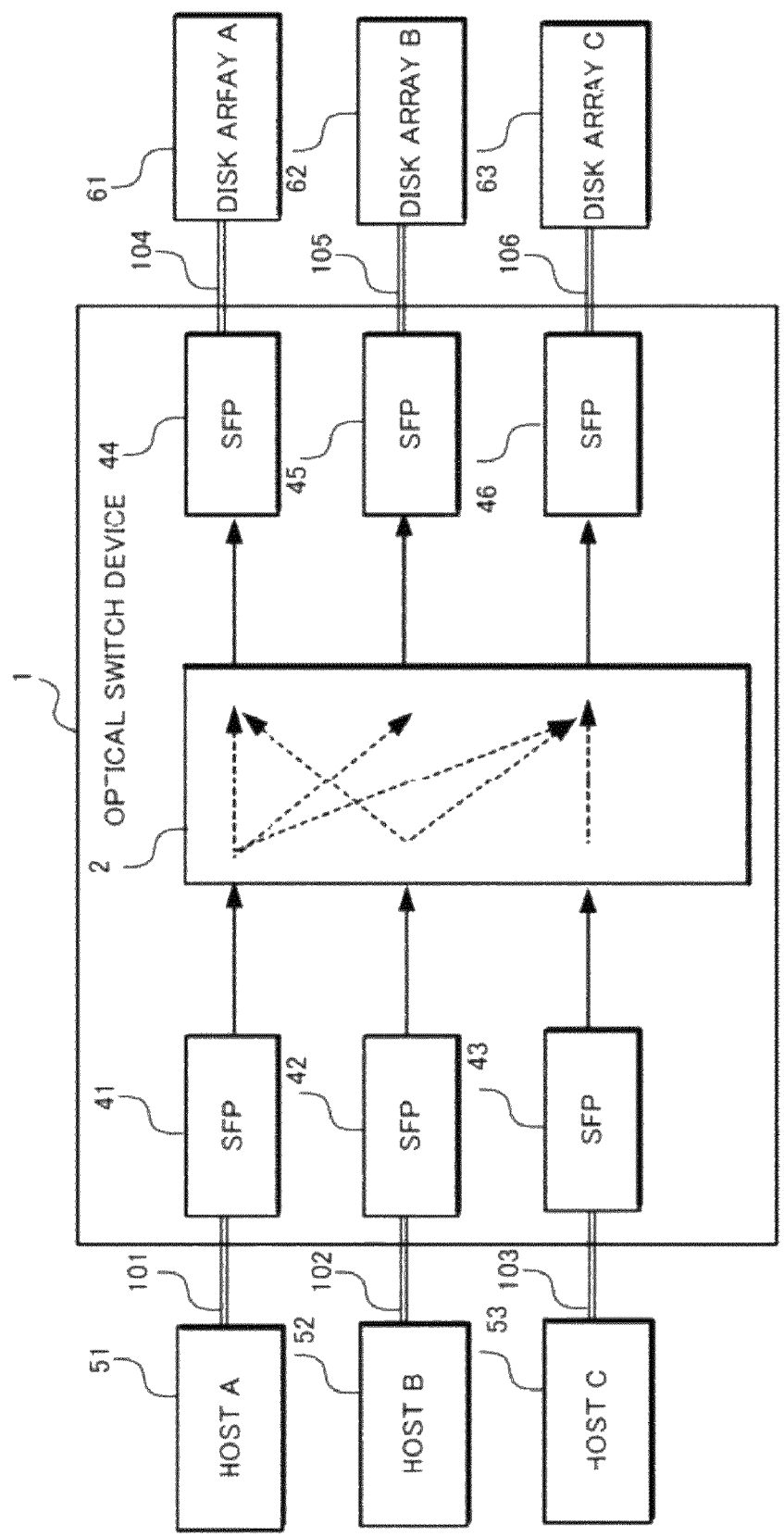
FIG. 3 is a diagram showing one example of a connection path of each apparatus realized by the optical switch device illustrated in FIG. 1.
Figure 4:
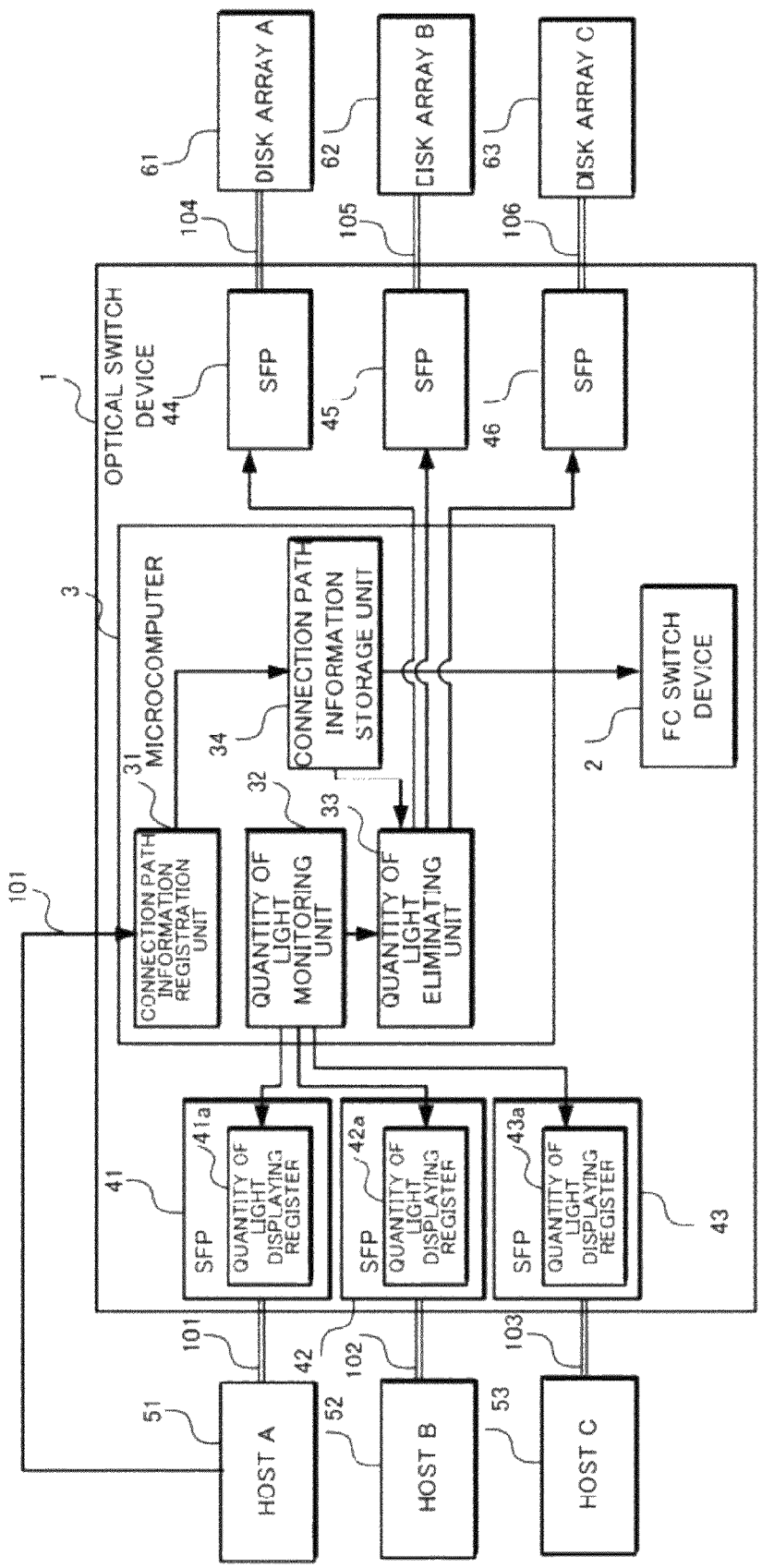
FIG. 4 is a functional block diagram showing a detailed structure of the optical switch device illustrated in FIG. 1.
Figure 5:
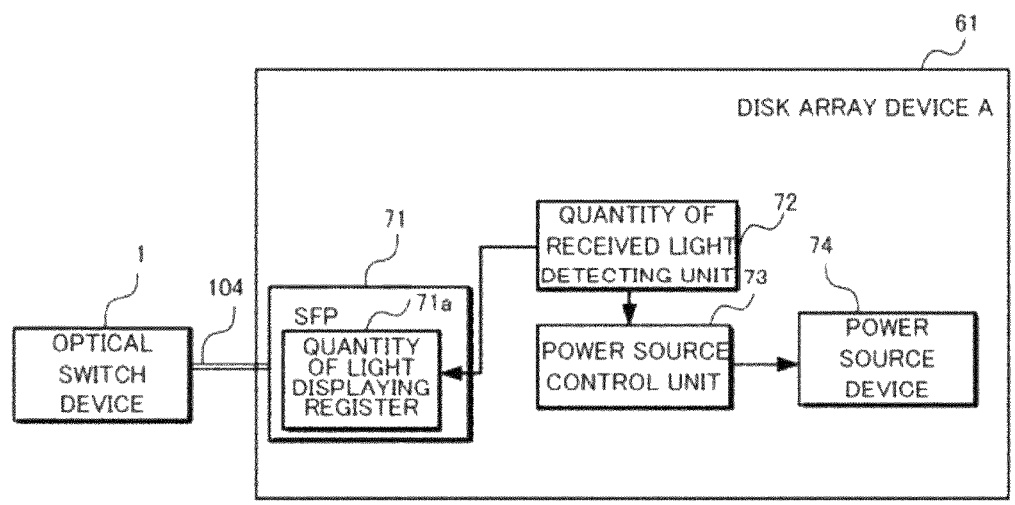
FIG. 5 is a functional block diagram showing a structure of a disk array device illustrated in FIG. 1.
Figure 6:
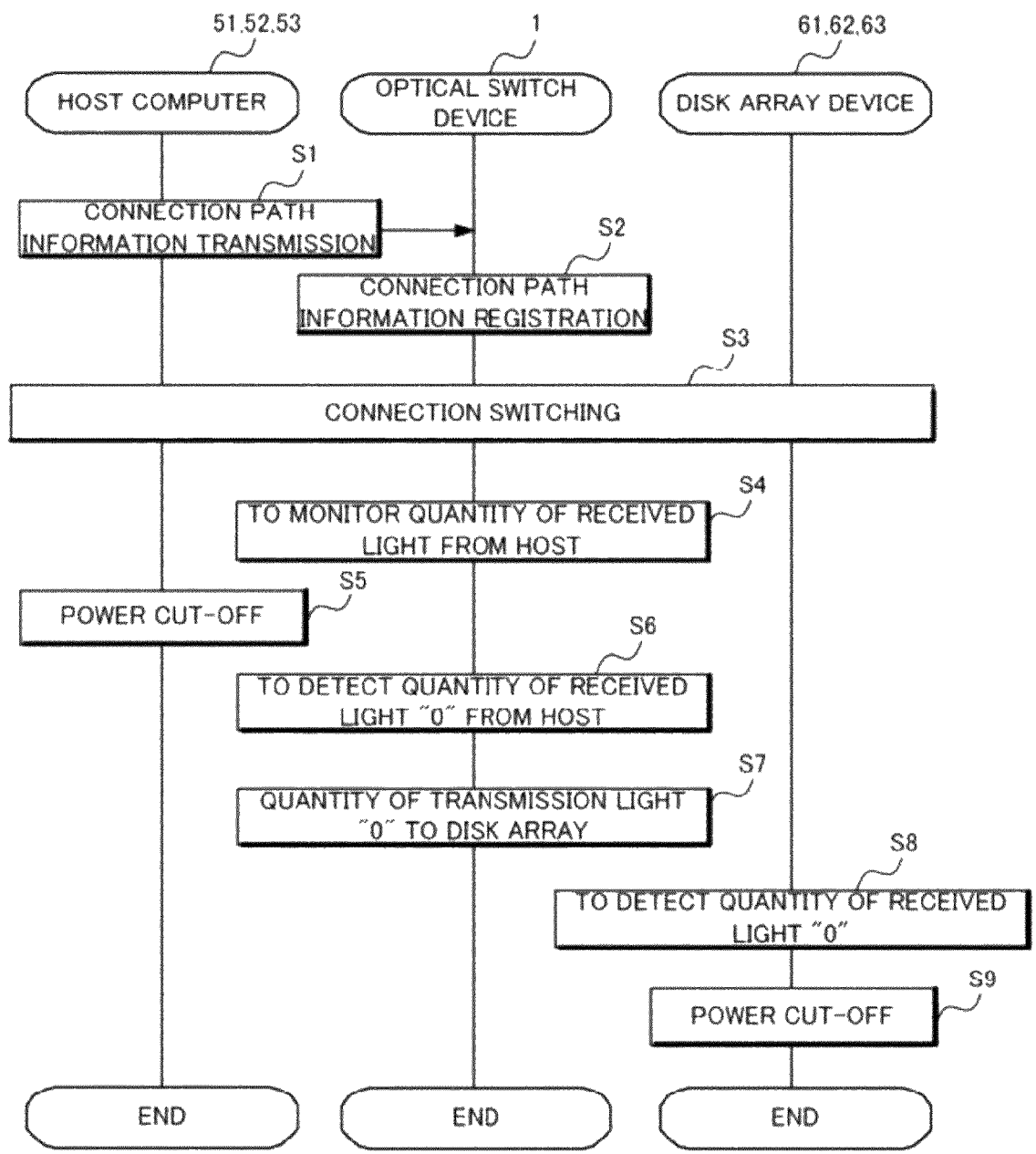
FIG. 6 is a sequence diagram showing operation of the entire system illustrated in FIG. 1.
Figure 7:
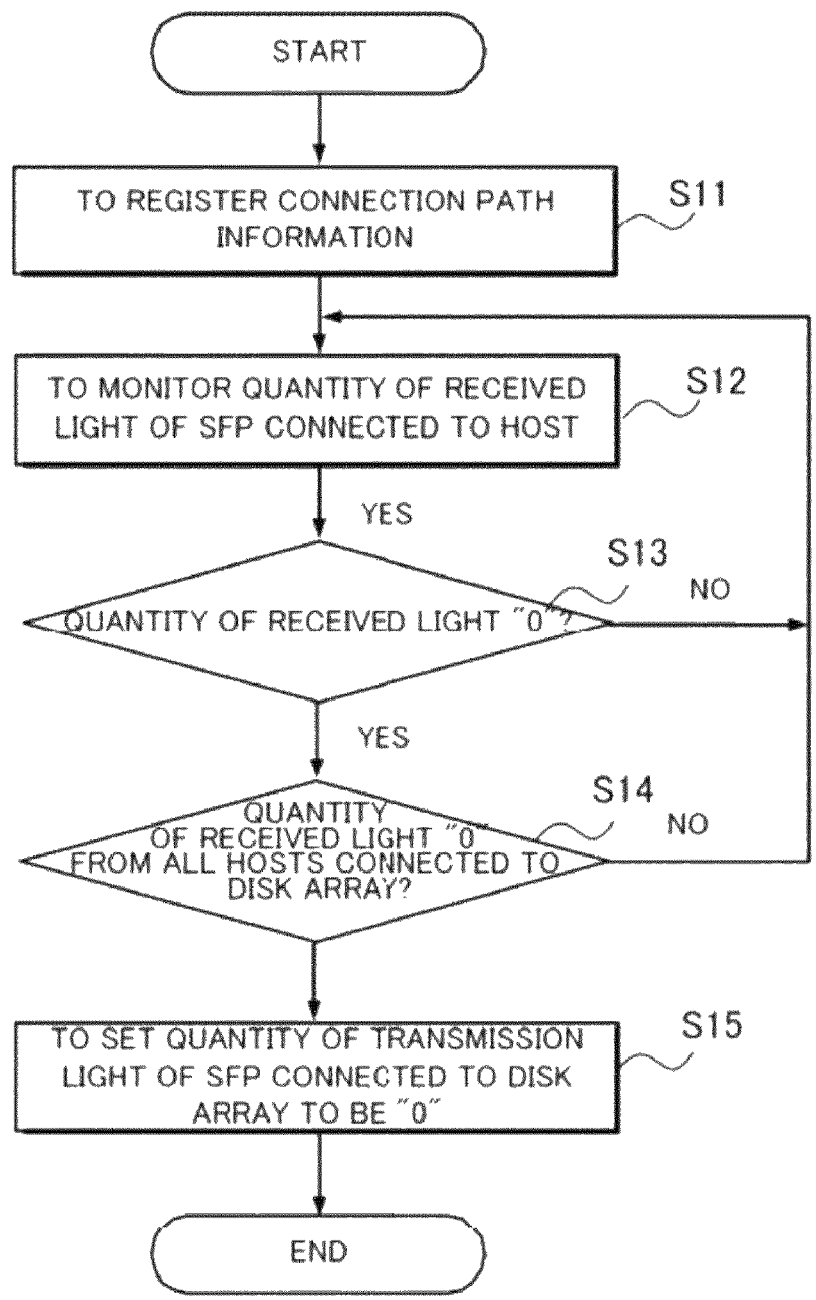
FIG. 7 is a flow chart showing operation of the optical switch device illustrated in FIG. 1.
Figure 8:
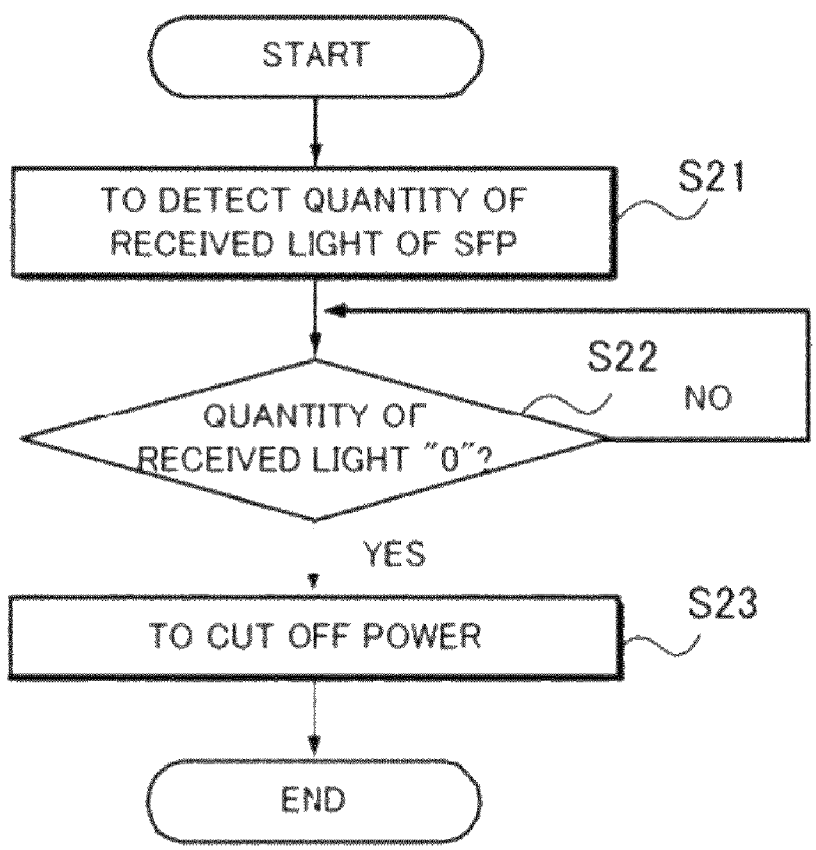
FIG. 8 is a flow chart showing operation of the disk array device illustrated in FIG. 1.

A first exemplary embodiment of the present invention will be described with reference to FIG. 1 through FIG. 8. FIG. 1 is a block diagram showing an entire structure of a system. FIG. 2 is a block diagram showing an internal structure of an optical switch device. FIG. 3 is a diagram showing a connection path of each apparatus formed by the optical switch device. FIG. 4 is a functional block diagram showing a detailed structure of the optical switch device. FIG. 5 is a functional block diagram showing a structure of a disk array device. FIG. 6 is a sequence diagram showing operation of the entire system. FIG. 7 is a flow chart showing operation of the optical switch device. FIG. 8 is a flow chart showing operation of the disk array device.

(Structure)

A connection system with an apparatus connected through a switch device according to the present exemplary embodiment is a storage system with a storage area network (SAN) formed by using a fiber channel technique. More specifically, as shown in FIG. 1, three host computers A (51), B (52) and C (53) and three disk array devices A (61), B (62) and C (63) are connected through an optical switch device 1 to form SAN.

Then, the host computers A (51), B (52) and C (53) are connected to the optical switch device 1 through optical transmission cables 101, 102 and 103. This arrangement enables the respective host computers A, B, and C (apparatus) to communicate with the disk array devices A, B, and C (apparatus (other apparatus)) through the optical transmission cables 101, 102 and 103 (communication cable).

The host computer A (51) is also connected to the optical switch device 1 additionally through a general-purpose communication cable 110 such as Ethernet (registered trademark) or RS232. By communication with the optical switch device 1 through the general-purpose communication cable 110, the host computer A is allowed to set the optical switch device 1 or register connection path information.

Here, connection path information is information indicative of a connection relationship set in advance between each host computer A, B, C and the disk array device A, B, C. One example will be described with reference to FIG. 3. Such connection path information as indicated by dotted lines in the figure will be information, with respect to the host computer A, that "the host A accesses the disk array A, the disk array B and the disk array C". Connection path information with respect to the host computer B will be information that "the host B accesses the disk array A and the disk array C". Connection path information with respect to the host computer C will be information that "the host C accesses the disk array C". The above-described connection setting information is, for example, input to the host computer A by an operator, so that the host computer A transmits the information to the optical switch device 1 through the general-purpose communication cable 110, which information will be resultantly registered in the optical switch device 1.

Next, the stricture of the optical switch device 1 will be described. The optical switch device 1, as shown in FIG. 2, comprises an FC (fiber channel) switch device 2 and a microcomputer 3. The optical switch 1 also comprises SFPs (Small Form factor Pluggable) 41 through 46 which are interface connectors of fiber channels to which respective optical transmission cables 101 through 106 connected to the host computers A, B and C and the disk array devices A, B and C, respectively, are connected.

Then, the SFPs 41 through 46 are transmission/reception units for transmitting and receiving an optical signal to/from the host computers A, B and C and the disk array devices A, B and C through the optical transmission cables 101 through 106, which are photoelectric transducers for converting a transmitted/received optical signal into an electric signal. These SFPs 41 thought 46 are connected to the FC switch device 2 in the optical switch device 1, whose connection can be switched among the respective SFPs 41 through 46. More specifically, by the switching of connection by the FC switch device 2, the SFPs 41, 42 and 43 connected to the host computers A, B and C will be connected to the SFPs 44, 45 and 46 connected to the disk array devices 61, 62 and 63, respectively.

In addition, the SFPs 41, 42 and 43 connected to the host computers A, B, and C comprise quantity of light displaying registers 41a, 42a and 43a, respectively, as shown in FIG. 4. These quantity of light displaying registers 41a, 42a and 43a, which are provided in common in such a standardized optical transceiver as SFP, have a function of displaying the quantity of light received from each of the connected optical transmission cables 101, 102 and 103 on the register. In the optical transmission cables 101, 102 and 103, while the host computer A, B, C as a connected apparatus is activated normally, light flashes and the quantity of light is constantly displayed on the quantity of light displaying registers 41a, 42a and 43a. Conversely, when the host computer A, B, C stops, no light flashes and the quantity of light displayed on the quantity of light displaying registers 41a, 42a and 43a is "0".

As described above, the FC switch device 2 (connection switching unit) executes connection switching between the SFPs 41 through 46. For example, as described above, based on the connection path information registered in the optical switch device 1, execute connection control in a manner as shown in FIG. 3. This enables the host computers A, B and C and the disk array devices A, B and C to be connected with each other.

The microcomputer 3 is a computer comprising an arithmetic device and a storage device. Then, as shown in FIG. 3, the microcomputer 3 is connected to the host computer A through the general-purpose communication cable 110 and connected to each SFP 41~46 through an I2C (Inter-integrated Circuit) interface.

Then, the microcomputer 3, as shown in FIG. 4, comprises a connection path information registration unit 31, a quantity of light monitoring unit 32 and a quantity of light eliminating unit 33 which are set up by incorporating a program into an arithmetic device (not shown). The microcomputer 3 further has a connection path information storage unit 34 formed in a storage device (not shown).

The connection path information registration unit 31 receives connection path information transmitted from the host computer A (51) through the general-purpose communication cable 110 as described above and registers the same in the connection path information storage unit 34. The connection path information storage unit 34 (connection path information storage means) has a function of providing the FC switch device 2 or the quantity of light eliminating unit 33 with registered connection path information so as to be referred to.

The quantity of light monitoring unit 32 (quantity of light monitoring means (reception state monitoring means)) monitors a quantity of received light of the SFPs 41, 42 and 43 to which the host computers A, B and C are connected. More specifically, the quantity of light monitoring unit 32 reads a quantity of light displayed on each quantity of light displaying register 41a, 42a, 43a provided in each SFP 41, 42, 43 at time intervals set in advance (e.g. 10 sec. each). Then, when the read quantity of received light from the host computer A, B, C is "0", specify the host computer A, B, C and notify the quantity of light eliminating unit 33 of the same. As described above, a case where the quantity of received light goes "0" is a case where power of a host computer connected to the SFP is cut off. "Quantity of received light 0" in the present invention represents that a quantity of received light is not more than a certain threshold value (e.g. "−20 dBm"). This is because when no cable is connected, there occurs a case where not 0 but a small quantity of light is detected.

In addition, the quantity of light eliminating unit 33 (quantity of light eliminating means (transmission stopping means) operates every time the quantity of light monitoring unit 32 detects a quantity of received light. In other words, when the quantity of light monitoring unit 32 detects an SFP whose quantity of received light attaining "0", the quantity of light eliminating unit 33 has its connection switched to the SFP in question by the FC switch device 2 to execute processing of stopping a transmission state of other SFP having a connection relationship. More specifically, when the quantity of received light from the host computer attains "0", the quantity of light eliminating unit 33 executes control to make a quantity of transmission light of an SFP be 0 which SFP is connected to a disk array device connected with the host computer in question by a path based on the above connection path information. At this time, in a case where there exist a plurality of host computers connected to a specific disk array device by a path, when a quantity of received light from each of the plurality of host computers all attains "0", the quantity of transmission light of an SFP connected to the specific disk array device is set to be "0". The quantity of light eliminating unit 33 is allowed to set the quantity of transmission light of the SFP to be "0" by applying a High level signal to an input pin called "Tx_Disable" which is defined by SFF Committee (industry organization: http://www.sffcommittee.org/ie/) and connected to the SFPs 44, 45 and 46, for example.

Description will be here made, as one example, of operation of the quantity of light eliminating unit 33 to be executed in a case where registered connection path information is as described above, that is, as shown in FIG. 3. First, when the host A and the host B are set to be connected to the disk array A by a path, the quantity of light eliminating unit 33 sets the quantity of transmission light of the SFP 44 to which the disk array A is connected to be 0 when the quantities of received light of the SFPs 41 and 42 connected to the host A and the host B, respectively, attain 0. In a case where it is set to have the disk array B connected to the host A by a path, when the quantity of received light of the SFP 41 connected to the host A attains 0, the quantity of light eliminating unit 33 makes the quantity of transmission light of the SFP 45 to which the disk array B is connected be 0. In a case where it is set to have the disk array C connected to the host A, the host B and the host C by a path, when the quantities of received light of the SFPs 41, 42 and 43 connected to the host A, the host B and the host C, respectively, attain 0, the quantity of light eliminating unit 33 sets the quantity of transmission light of the SFP 46 to which the disk array C is connected to be 0.

Next, structures of the disk array devices A, B and C will be described with reference to FIG. 5. Since the disk array devices all have the same stricture, description will be made only of the structure of the disk array device A.

As shown in FIG. 5, the disk array device A (61) comprises a power source device 74 which supplies power necessary for its own device to operate. The disk array device A further comprises an SFP (photoelectric transducer) 71 as an interface connector (transmission/reception means) of a fiber channel to which the optical transmission cable 104 connected to the optical switch device 1 is connected. Then, the SFP 71 comprises a quantity of light displaying register 71a for displaying a quantity of light received from the connected optical transmission cable 104 on the register. The disk array device A also comprises an arithmetic device and comprises a quantity of received light detecting unit 72 and a power source control unit 73 which are set up by incorporating a program into the arithmetic device.

Then, the quantity of received light detecting unit 72 (reception stop detecting unit) monitors a quantity of received light of the SFP 71. More specifically, the quantity of received light detecting unit 72 reads a quantity of light displayed on the quantity of light displaying register 71a provided in the SFP 71 at time intervals set in advance (e.g. 10 sec. each). Then, when the read quantity of light received is "0", notify the power source control unit 73 to that effect. A case where the quantity of received light of the SFP 71 is "0" is a case where a quantity of a transmission light from the SFP 44 on the optical switch device 1 side to which the optical transmission cable 104 connected to the SFP 71 is connected goes 0.

The power source control unit 73 (power source cut-off means) executes on/off control of the power of the power source device 74. Then, upon receiving a notification that the quantity of received light of the SFP 71 from the quantity of received light detecting unit 72 attains "0", control the operation of the power source device 74 to cut off the power of the disk array device A itself.

(Operation)

Next, operation of thus structured storage system will be described with reference to FIG. 6 through FIG. 8. Here, FIG. 6 is a sequence diagram showing operation of the entire storage system. FIG. 7 is a flow chart showing detailed operation of the optical switch device 1 and FIG. 8 is a flow chart showing detailed operation of the disk array devices A, B and C.

First, the host computer A (51) transmits connection path information indicative of such a connection relationship between the host computer A, B, C and the disk array device A, B, C which information is input by an operator or the like as shown in FIG. 3 to the optical switch device 1 through the general-purpose communication cable 110 (Step S1 in FIG. 6). Then, the optical switch device 1 having received the connection path information from the host computer A (51) stores and registers the information in the microcomputer 3 (Step S2 in FIG. 6, Step 11 in FIG. 7). As a result, the optical switch device 1 executes connection switching such that each host computer A, B, C (SFP 41, 42, 43) and the disk array device A, B, C (SFP 44, 45, 46) are connected by such a connection path as shown in FIG. 3 (Step S3 in FIG. 6).

Subsequently, the optical switch device 1 monitors whether the quantity of received light of the SFPs 41, 42 and 43 to which the host computers A, B and C are connected attains "0" or not at time intervals of 10 sec., for example (Step S4 in FIG. 6, Step S12 in FIG. 7: the reception state monitoring step). Assume that at this time, power of any of the host computers A, B and C is cut off (Step S5 in FIG. 6). Then, the quantity of received light of an SFP to which the host computer in question is connected through the optical transmission cable attains "0", so that the optical switch device 1 detects the quantity of received light of the SFP attaining "0" (Step S6 in FIG. 6, yes at Step S13 in FIG. 7).

Then, the optical switch device 1 refers to the connection path information to check whether the quantities of received light from all the host computers connected to a certain disk array device by a path attain "0" (Step S14 in FIG. 7). Then, when there exists a disk array device whose quantities of received light from all the host computers connected by a path are "0" (yet at Step S14 in FIG. 7), the optical switch device 1 executes control to make the quantity of transmission light of the SFP connected to the disk array device be "0" (Step S7 in FIG. 6, Step S15 in FIG. 7: the transmission stopping step).

Detailed description will be here made, as one example, of the above-described operation to be executed in a case where registered connection path information is as shown in FIG. 3. First, in a case where the host A and the host B are set to be connected to the disk array A by a path, when the quantities of received light of the SFPs 41 and 42 connected to the host A and the host B, respectively, attain 0, set the quantity of transmission light of the SFP 44 to which the disk array A is connected to be 0. In a case where the host A is set to be connected to the disk array B by a path, when the quantity of received light of the SFP 41 connected to the host A attains 0, make the quantity of transmission light of the SFP 45 to which the disk array B is connected be 0. In a case where the host A, the host B and the host C are set to be connected to the disk array C by a path, when the quantities of received light of the SFPs 41, 42 and 43 connected to the host A, the host B and the host C, respectively, attain 0, make the quantity of transmission light of the SFP 46 to which the disk array C is connected be 0.

Subsequently, assume that the disk array devices A, B and C monitor a quantity of received light of the SFP 71 mounted on the device itself (Step S21 in FIG. 8) to detect the quantity of received light attaining "0" (Step S8 in FIG. 6, Step S22 in FIG. 8: the reception stop detecting step). The disk array device thus detecting the quantity of received light attaining "0" will have power of all the host computers connected to the device itself by a path cut off. Then, the disk array device will execute control to cut off the power of the device itself (Step S9 in FIG. 6, Step S23 in FIG. 8: the power cut-off step).

As described in the foregoing, even when power cut-off order is fixed such as that of a host computer and a disk array device connected through an optical switch device, the present exemplary embodiment enables automatic cut-off of the disk array device according to power cut-off of the connected host computer. In this case, since this can be realized by providing the switch device with the above-described functions without requiring additional provision of a special device, reduction in power consumption can be realized at low costs.

While the foregoing is the description of an example in which a common disk array device compatible with a fiber channel is used, the same can be realized by other disk array device connectable by an optical fiber using SFP. Implementable, for example, is a disk array device compatible with an iSCSI (Internet Small Computer System Interface) connected by the optical fiber Ethernet (registered trademark) such as IEEE (Institute of Electrical and Electronic Engineers) 802.3ah.

While the description has been made in the foregoing with respect to a case where connection between a host computer and a disk array device is switched through an optical switch device, a device whose connection should be switched may be other storage device. Moreover, the above-described optical switch device is also applicable to a case where connection of any of apparatuses is switched.

SECOND EXEMPLARY EMBODIMENT

Next, a second exemplary embodiment of the present invention will be described with reference to FIG. 9. Used in the present exemplary embodiment is not only an optical switch device which switches connection between apparatuses connected by an optical transmission cable as described above but also a switch device which switches connection between predetermined apparatuses connected by a common communication cable not using optical communication.

Figure 9:
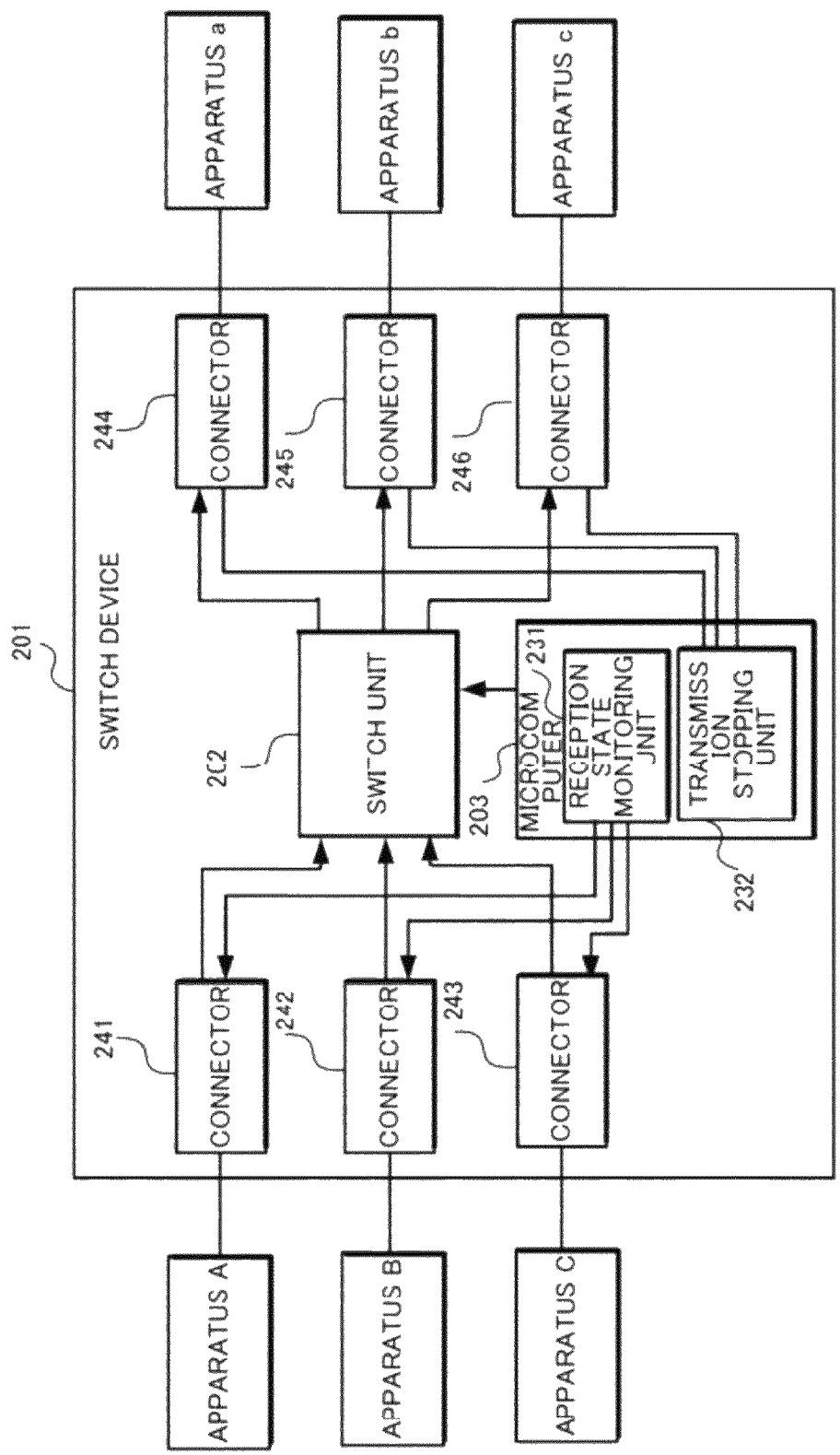
FIG. 9 is a block diagram showing a structure of the entire system according to a second exemplary embodiment.

More specifically, in a connection system shown in FIG. 9, apparatuses A, B and C and apparatuses a, b, c are connected to a switch device 201 through a communication cable. Then, the switch device comprises connectors (transmission/reception units) 241 through 246 connected to the communication cable for transmitting/receiving a signal to/from each apparatus. The switch device 201 also comprises a switch unit 202 (connection switching unit) to which each of the connectors 241 through 246 is connected, and the switch unit 202 executes connection switching between the respective connectors 241 through 246. This arrangement enables the switch device 201 to switch connection among the respective apparatuses A, B, C, a, b and c.

Then, the switch device 201 according to the present exemplary embodiment comprises a reception state monitoring unit 231 (reception state monitoring means) and a transmission stopping unit 232 (transmission stopping means) formed by incorporating a program into a mounted microcomputer 203.

Similarly to the quantity of light monitoring unit 32 that the optical switch device 1 has which has been described in the above first exemplary embodiment, the reception state monitoring unit 231 monitors a reception state of the connectors 241, 242 and 243 to which the apparatuses A, B and C are connected. By detecting the connectors 241, 242 and 243 failing to receive a predetermined signal such as a clock signal, for example, the reception state monitoring unit 231 detects cut-off of power of an apparatus connected to the connector in question.

Upon detecting a connector failing to receive a signal by the reception state monitoring unit 231 as described above, the transmission stopping unit 232 executes processing of stopping signal transmission with respect to other connector connected to other apparatus a, b, c having a connection relationship with the detected connector. Execute control to bring an operation state of the connector in question into a signal transmission disabled state by, for example, transmitting a predetermined signal to the target connector, thereby stopping sending-out of the clock signal. At this time, execute signal transmission stopping processing with respect to other connector to which other apparatus a, b, c having received no signal from every apparatus A, B, C connected by the path is connected. Here, similarly to the above first exemplary embodiment, the transmission stopping unit 232 refers to the connection path information indicative of a connection relationship between apparatuses set in advance to execute the foregoing processing. The connection path information may be stored in the microcomputer 203 or may be stored outside the switch device 201 to which reference is made.

Then, other apparatus a, b, c detects a reception state of the connector 244 brought into the signal transmission stopped state. Other apparatus a, b, c, for example, monitors whether a connector (not shown) for the connection with the switch device 201 mounted in the apparatus itself receives a clock signal or not. Then, when no clock signal is received, other apparatus a, b, c is allowed to determine that the power of the apparatus A, B, C connectable to the apparatus itself by the path is being cut off to automatically cut off the power.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be used as a system in which apparatuses including a storage network such as SAN are connected with each other through a switch device, so that it has an industrial applicability.

What is claimed is:

1. A switch device, comprising:
transmission/reception unit each connected to each of apparatuses through a communication cable for transmitting/receiving a signal to/from each apparatus;
a connection switching unit for switching connection between said apparatuses by switching connection between said transmission/reception unit;
a reception state monitoring unit for monitoring a signal reception state of said transmission/reception unit; and
a transmission stopping unit for executing signal transmission stopping processing according to a monitoring result obtained by said reception state monitoring unit with respect to other said transmission/reception unit to which connected through said communication cable is another apparatus having a connection relationship with said apparatus to which said transmission/reception unit is connected through said communication cable;
wherein said communication cable is an optical transmission cable, and said transmission/reception unit is a photoelectric transducer for converting an optical signal communicated with said apparatus through said optical transmission cable into an electric signal,
said reception state monitoring unit comprises a quantity of light monitoring unit for monitoring a quantity of received light of said photoelectric transducer, and
said transmission stopping unit comprises a quantity of light eliminating unit for eliminating a quantity of transmission light of other photoelectric transducer as said other transmission/reception unit,
wherein said quantity of light eliminating unit, according to a monitoring result obtained by said quantity of light monitoring unit, when a quantity of received light of all said photoelectric transducers to which connected through said optical transmission cable are all apparatuses having a connection relationship with specific said apparatus attains 0 based on connection path information indicative of a connection relationship set in advance between said apparatuses, eliminates a quantity of transmission light of said other photoelectric transducer to which said specific apparatus is connected through said optical transmission cable.

2. The switch device according to claim 1, wherein
said quantity of light monitoring unit monitors whether the quantity of received light of said photoelectric transducer is 0 or not, and
said quantity of light eliminating unit eliminates, based on monitoring result obtained by said quantity of light monitoring unit, a quantity of transmission light of other said photoelectric transducer to which connected through said optical transmission cable is another apparatus having a connection relationship with said apparatus to which said photoelectric transducer whose said quantity of received light attains 0 is connected through said optical transmission cable.

3. The switch device according to claim 1, wherein
said reception state monitoring unit operates at time intervals set in advance, and
said transmission stopping unit operates every time said reception state monitoring unit detects a signal reception state of said transmission/reception unit.

4. The switch device according to claim 1, further comprising a connection path information storing unit which stores connection path information indicative of a connection relationship set in advance between said apparatuses, wherein
said transmission stopping unit executes signal transmission stopping processing with respect to other said transmission/reception unit to which connected through said communication cable is another apparatus having a connection relationship with said apparatus to which said transmission/reception unit monitored by said reception state monitoring unit is connected through said communication cable based on said connection path information.

5. The switch device according to claim 1, wherein
said apparatus to which connected through said communication cable is said transmission/reception unit monitored by said reception state monitoring unit is a host computer, and
said other apparatus to which connected through said communication cable is said other transmission/reception unit whose signal transmission stopping processing is executed by said transmission stopping unit is a storage device.

6. A connection system, comprising:
a switch device including transmission/reception unit each connected to each of apparatuses through a communication cable for transmitting/receiving a signal to/from each apparatus, and a connection switching unit for switching connection between said apparatuses by switching connection between said transmission/reception unit; and
said apparatus, wherein
said switch device comprising
a reception state monitoring unit for monitoring a signal reception state of said transmission/reception unit, and
a transmission stopping unit for executing signal transmission stopping processing according to a monitoring result obtained by said reception state monitoring unit with respect to other said transmission/reception unit to which connected through said communication cable is another apparatus having a connection relationship with said apparatus to which said transmission/reception unit is connected through said communication cable, and
said apparatus comprises
a reception stop detecting unit for detecting the device itself receiving no signal or not, and
a power cut-off unit for cutting off power of the device itself when the reception stop detecting unit detects no signal reception
wherein said communication cable is an optical transmission cable, and said transmission/reception unit that said switch device has is a photoelectric transducer for converting an optical signal communicated with said apparatus through said optical transmission cable into an electric signal,
said reception state monitoring unit that said switch device has comprises a quantity of light monitoring unit for monitoring a quantity of received light of said photoelectric transducer, and said transmission stopping unit that said switch device has comprises a quantity of light eliminating unit for eliminating a quantity of transmission light of other photoelectric transducer as said other transmission/reception unit, and
said apparatus comprises a photoelectric transducer connected to said optical transmission cable connected to said switch device, said reception stop detecting unit that said apparatus has detects a quantity of received light of said photoelectric transducer provided in the device itself being 0 or not, and said power cut-off unit that said apparatus has cuts off power of the device itself when said reception stop detecting unit detects the quantity of received light of said photoelectric transducer being 0.

7. The connection system according to claim 6, wherein
said apparatus to which connected through said communication cable is said transmission/reception unit monitored by said reception state monitoring unit that said switch device has is a host computer, and
said other apparatus to which connected through said communication cable is said other transmission/reception unit whose signal transmission stopping processing is executed by said transmission stopping unit that said switch device has is a storage device.

8. A computer readable medium storing a program, which program causes a switch device having transmission/reception unit each connected to each of apparatuses through a communication cable for transmitting/receiving a signal to/from each apparatus and a connection switching unit for switching connection between said apparatuses by switching connection between said transmission/reception unit to execute:

a reception state monitoring function of monitoring a signal reception state of said transmission/reception unit; and
a transmission stopping function of executing signal transmission stopping processing according to a monitoring result obtained by said reception state monitoring function with respect to other said transmission/reception unit to which connected through said communication cable is other said another apparatus having a connection relationship with said apparatus to which said transmission/reception unit is connected through said communication cable
wherein when said communication cable is an optical transmission cable and said transmission/reception unit is a photoelectric transducer for converting an optical signal communicated with said apparatus through said optical transmission cable into an electric signal,
said reception state monitoring function includes a quantity of light monitoring function of monitoring a quantity of received light of said photoelectric transducer, and
said transmission stopping function includes a quantity of light eliminating function of eliminating a quantity of transmission light of other photoelectric transducer as said other transmission/reception unit,
wherein said quantity of light eliminating function, according to a monitoring result obtained by said quantity of light monitoring function, when a quantity of received light of all said photoelectric transducers to which connected through said optical transmission cable are all apparatuses having a connection relationship with specific said apparatus attains 0 based on connection path information indicative of a connection relationship set in advance between said apparatuses, eliminates a quantity of transmission light of said other photoelectric transducer to which said specific apparatus is connected through said optical transmission cable.

9. A connection control method of a switch device having transmission/reception unit each connected to each of apparatuses through a communication cable for transmitting/receiving a signal to/from each apparatus and a connection switching unit for switching connection between said apparatuses by switching connection between said transmission/reception unit, comprising:

a reception state monitoring step of monitoring a signal reception state of said transmission/reception unit; and
a transmission stopping step of executing signal transmission stopping processing according to a monitoring result obtained at said reception state monitoring step with respect to other said transmission/reception unit to which connected through said communication cable is other said another apparatus having a connection relationship with said apparatus to which said transmission/reception unit is connected through said communication cable,
wherein when said communication cable is an optical transmission cable and said transmission/reception unit is a photoelectric transducer for converting an optical signal communicated with said apparatus through said optical transmission cable into an electric signal,
said reception state monitoring step includes a quantity of light monitoring step of monitoring a quantity of received light of said photoelectric transducer, and
said transmission stopping step includes a quantity of light eliminating step of eliminating a quantity of transmission light of other said photoelectric transducer as said other transmission/reception unit, wherein said quantity of light eliminating step, according to a monitoring result obtained by said quantity of light monitoring step, when a quantity of received light of all said photoelectric transducers to which connected through said optical transmission cable are all apparatuses having a connection relationship with specific said apparatus attains 0 based on connection path information indicative of a connection relationship set in advance between said apparatuses, eliminates a quantity of transmission light of said other photoelectric transducer to which said specific apparatus is connected through said optical transmission cable.

10. The connection control method according to claim 9, further comprising:

a reception stop detecting step of detecting said other apparatus receiving no signal or not, which apparatus is connected through said communication cable to said other transmission/reception unit whose quantity of transmission light is eliminated at said transmission stopping step; and a power cut-off step of cutting off, when detecting said other apparatus receiving no signal at said reception stop detecting step, power of other apparatus in question.

11. The connection control method according to claim 10, wherein said reception stop detecting step detects a quantity of received light of a photoelectric transducer that is connected to an optical transmission cable as said communication cable to which said other apparatus is connected and that is provided in other apparatus in question being 0 or not, and said power cut-off step cuts off power of said other apparatus when said reception stop detecting step detects the quantity of received light of said photoelectric transducer being 0 at said reception stop detecting step.

* * * * *